United States Patent
Fukumori et al.

(10) Patent No.: US 11,110,992 B2
(45) Date of Patent: Sep. 7, 2021

(54) BICYCLE TRANSMISSION CONTROL DEVICE

(71) Applicant: SHIMANO Inc., Sakai (JP)

(72) Inventors: Tsuyoshi Fukumori, Sakai (JP); Takeshi Ueda, Sakai (JP)

(73) Assignee: Shimano Inc., Sakai (JP)

( * ) Notice: Subject to any disclaimer, the term of this patent is extended or adjusted under 35 U.S.C. 154(b) by 41 days.

(21) Appl. No.: 16/431,327

(22) Filed: Jun. 4, 2019

(65) Prior Publication Data

US 2020/0385088 A1  Dec. 10, 2020

(51) Int. Cl.
*B62M 9/122* (2010.01)
*B62M 25/08* (2006.01)

(52) U.S. Cl.
CPC ............ *B62M 9/122* (2013.01); *B62M 25/08* (2013.01)

(58) Field of Classification Search
CPC ...... B62M 9/122; B62M 9/132; B62M 25/08; F16H 59/44; F16H 59/70
See application file for complete search history.

(56) References Cited

U.S. PATENT DOCUMENTS

| | | | |
|---|---|---|---|
| 5,199,929 A * | 4/1993 | Stites | B62M 9/04 474/123 |
| 9,623,931 B2 | 4/2017 | Emura et al. | |
| 9,682,744 B2 | 6/2017 | Watarai | |
| 2014/0121922 A1* | 5/2014 | Vasiliotis | B62M 11/14 701/60 |
| 2014/0303857 A1* | 10/2014 | Takamoto | B62M 25/08 701/51 |
| 2017/0225743 A1* | 8/2017 | Hara | B62M 9/132 |

* cited by examiner

*Primary Examiner* — Edwin A Young
(74) *Attorney, Agent, or Firm* — Alleman Hall Creasman & Tuttle LLP

(57) ABSTRACT

A bicycle transmission control device comprises a controller configured to control an operating speed of a bicycle derailleur based on a running speed of a bicycle and a gear ratio of the bicycle.

17 Claims, 9 Drawing Sheets

BICYCLE TRANSMISSION CONTROL DEVICE

BACKGROUND

Technical Field

The technology disclosed herein relates to a bicycle transmission control device.

Background Information

Bicycling is becoming an increasingly more popular form of recreation as well as a means of transportation. Moreover, bicycling has become a very popular competitive sport for both amateurs and professionals.

Whether the bicycle is used for recreation, transportation or competition, the bicycle industry is constantly improving the various components of the bicycle. One bicycle component that has been extensively redesigned is a bicycle transmission control device. The bicycle transmission control device is mounted to a bicycle frame.

SUMMARY OF THE INVENTION

In accordance with a first aspect of the present invention, a bicycle transmission control device comprises a controller configured to control an operating speed of a bicycle derailleur based on a running speed of a bicycle and a gear ratio of the bicycle.

With the bicycle transmission control device according to the first aspect, the bicycle transmission control device is capable of optimally controlling the operating speed thereof. Also, the bicycle transmission control device is capable of steadily guiding a bicycle chain from a chain engaging sprocket to another sprocket adjacent to the chain engaging sprocket.

In accordance with a second aspect of the present invention, the bicycle transmission control device according to the first aspect is configured so that the operating speed includes a first operating speed and a second operating speed that is different from the first operating speed.

The controller is configured to control the operating speed so that the operating speed is the first operating speed in a state where the running speed is a first running speed and the gear ratio is a first gear ratio.

The controller is configured to control the operating speed so that the operating speed is the second operating speed in a state where the running speed is a second running speed and the gear ratio is a second gear ratio.

With the bicycle transmission control device according to the first aspect, the bicycle transmission control device is capable of optimally controlling the first and second operating speeds thereof in the above state.

In accordance with a third aspect of the present invention, the bicycle transmission control device according to the second aspect is configured so that the first running speed is equal to the second running speed. The first gear ratio is different from the second gear ratio.

With the bicycle transmission control device according to the third aspect, the bicycle transmission control device is capable of optimally controlling the first and second operating speeds thereof in this condition.

In accordance with a fourth aspect of the present invention, the bicycle transmission control device according to the third aspect is configured so that the first gear ratio is smaller than the second gear ratio. The first operating speed is larger than the second operating speed.

With the bicycle transmission control device according to the fourth aspect, the bicycle transmission control device is capable of optimally controlling the first and second operating speeds thereof in this condition.

In accordance with a fifth aspect of the present invention, the bicycle transmission control device according to the third aspect is configured so that the first gear ratio is smaller than the second gear ratio. The second operating speed is smaller than the first operating speed.

With the bicycle transmission control device according to the fifth aspect, the bicycle transmission control device is capable of optimally controlling the first and second operating speeds thereof in this condition.

In accordance with a sixth aspect of the present invention, the bicycle transmission control device according to the second aspect is configured so that the first running speed is different from the second running speed. The first gear ratio is equal to the second gear ratio.

With the bicycle transmission control device according to the sixth aspect, the bicycle transmission control device is capable of optimally controlling the first and second operating speeds thereof in this condition.

In accordance with a seventh aspect of the present invention, the bicycle transmission control device according to the sixth aspect is configured so that the first running speed is larger than the second running speed. The first operating speed is larger than the second operating speed.

With the bicycle transmission control device according to the seventh aspect, the bicycle transmission control device is capable of optimally controlling the first and second operating speeds thereof in this condition.

In accordance with an eighth aspect of the present invention, the bicycle transmission control device according to the sixth aspect is configured so that the first running speed is larger than the second running speed. The second operating speed is smaller than the second operating speed.

With the bicycle transmission control device according to the eighth aspect, the bicycle transmission control device is capable of optimally controlling the first and second operating speeds thereof in this condition.

In accordance with a ninth aspect of the present invention, the bicycle transmission control device according to the second aspect is configured so that the first running speed is different from the second running speed. The first gear ratio is different from the second gear ratio.

With the bicycle transmission control device according to the ninth aspect, the bicycle transmission control device is capable of optimally controlling the first and second operating speeds thereof in this condition.

In accordance with a tenth aspect of the present invention, the bicycle transmission control device according to the ninth aspect is configured so that the first running speed is larger than the second running speed. The first gear ratio is larger than the second gear ratio. The first operating speed is larger than the second operating speed.

With the bicycle transmission control device according to the tenth aspect, the bicycle transmission control device is capable of optimally controlling the first and second operating speeds thereof in this condition.

In accordance with an eleventh aspect of the present invention, the bicycle transmission control device according to the ninth aspect is configured so that the second running speed is smaller than the first running speed. The second gear ratio is smaller than the first gear ratio. The second operating speed is smaller than the first operating speed.

With the bicycle transmission control device according to the eleventh aspect, the bicycle transmission control device is capable of optimally controlling the first and second operating speeds thereof in this condition.

In accordance with a twelfth aspect of the present invention, the bicycle transmission control device according to the ninth aspect is configured so that the first running speed is smaller than the second running speed. The first gear ratio is smaller than the second gear ratio. The second operating speed is larger than the first operating speed.

With the bicycle transmission control device according to the twelfth aspect, the bicycle transmission control device is capable of optimally controlling the first and second operating speeds thereof in this condition.

In accordance with a thirteenth aspect of the present invention, the bicycle transmission control device according to the ninth aspect is configured so that the second running speed is larger than the first running speed. The second gear ratio is larger than the first gear ratio. The second operating speed is smaller than the first operating speed.

With the bicycle transmission control device according to the thirteenth aspect, the bicycle transmission control device is capable of optimally controlling the first and second operating speeds thereof in this condition.

In accordance with a fourteenth aspect of the present invention, the bicycle transmission control device according to the ninth aspect is configured so that the first running speed is larger than the second running speed. The first gear ratio is smaller than the second gear ratio. The first operating speed is larger than the second operating speed.

With the bicycle transmission control device according to the fourteenth aspect, the bicycle transmission control device is capable of optimally controlling the first and second operating speeds thereof in this condition.

In accordance with a fifteenth aspect of the present invention, the bicycle transmission control device according to the ninth aspect is configured so that the first running speed is larger than the second running speed. The first gear ratio is smaller than the second gear ratio. The first operating speed is smaller than the second operating speed.

With the bicycle transmission control device according to the fifteenth aspect, the bicycle transmission control device is capable of optimally controlling the first and second operating speeds thereof in this condition.

In accordance with a sixteenth aspect of the present invention, the bicycle transmission control device according to the ninth aspect is configured so that the second running speed is smaller than the first running speed. The second gear ratio is larger than the first gear ratio. The second operating speed is larger than the first operating speed.

With the bicycle transmission control device according to the sixteenth aspect, the bicycle transmission control device is capable of optimally controlling the first and second operating speeds thereof in this condition.

In accordance with a seventeenth aspect of the present invention, the bicycle transmission control device according to the ninth aspect is configured so that the first running speed is larger than the second running speed. The first gear ratio is smaller than the second gear ratio. The second operating speed is smaller than the first operating speed.

With the bicycle transmission control device according to the seventeenth aspect, the bicycle transmission control device is capable of optimally controlling the first and second operating speeds thereof in this condition.

In accordance with an eighteenth aspect of the present invention, the bicycle transmission control device according to any one of the first to seventeenth aspects comprises a memory configured to store a related information with respect to the running speed of the bicycle and the gear ratio of the bicycle.

With the bicycle transmission control device according to the eighteenth aspect, the bicycle transmission control device is capable of optimally controlling the operating speed thereof based on the related information.

In accordance with a nineteenth aspect of the present invention, the bicycle transmission control device according to the eighteenth aspect is configured so that the related information includes a table. The table includes a first region and a second region that is delimited from the first region by a boundary. The operating speed is a first operating speed in the first region. The operating speed is a second operating speed in the second region. The controller is configured to change the boundary depending on a cadence of a crank arm of the bicycle.

With the bicycle transmission control device according to the nineteenth aspect, the bicycle transmission control device is capable of optimally controlling the first and second operating speeds thereof based on the table.

In accordance with a twentieth aspect of the present invention, the bicycle transmission control device according to the first aspect is configured so that the operating speed includes a first operating speed and a second operating speed that is different from the first operating speed.

The controller is configured to control the operating speed so that the operating speed is the first operating speed in a state where the running speed is a predetermined running speed and the gear ratio is a predetermined gear ratio while a cadence of a crank arm of the bicycle is a first cadence.

The controller is configured to control the operating speed so that the operating speed is the second operating speed in a state where the running speed is the predetermined running speed and the gear ratio is the predetermined gear ratio while the cadence of a crank arm of the bicycle is a second cadence that is different from the first cadence.

With the bicycle transmission control device according to the twentieth aspect, the bicycle transmission control device is capable of optimally controlling the operating speed thereof in the above state.

In accordance with a twenty-first aspect of the present invention, the bicycle transmission control device according to the first aspect is configured so that the operating speed includes a first operating speed, a second operating speed and a third operating speed. The each of the first operating speed and the third operating speed is different from the second operating speed.

The controller is configured to control the operating speed so that the operating speed is the first operating speed in a state where the running speed is a first running speed and the gear ratio is a first gear ratio.

The controller is configured to control the operating speed so that the operating speed is the second operating speed in a state where the running speed is a second running speed and the gear ratio is a second gear ratio.

The controller is configured to control the operating speed so that the operating speed is the third operating speed in a state where the running speed is a third running speed and the gear ratio is a third gear ratio.

With the bicycle transmission control device according to the twenty-first aspect, the bicycle transmission control device is capable of optimally controlling the first to third operating speeds thereof in the above state.

In accordance with a twenty-second aspect of the present invention, the bicycle transmission control device according to the twenty-first aspect is configured so that the first operating speed is larger than the second operating speed.

With the bicycle transmission control device according to the twenty-second aspect, the bicycle transmission control device is capable of optimally controlling the first to third operating speeds thereof in this condition.

In accordance with a twenty-third aspect of the present invention, the bicycle transmission control device according to the twenty-second aspect is configured so that the third operating speed is larger than the second operating speed.

With the bicycle transmission control device according to the twenty-second aspect, the bicycle transmission control device is capable of optimally controlling the first to third operating speeds thereof in this condition.

BRIEF DESCRIPTION OF THE DRAWINGS

Referring now to the attached drawings, which form a part of this original disclosure.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

In this embodiment, the following directional terms "forward", "rearward", "left", "right", "high", "low", "upward" and "downward" as well as any other similar directional terms refer to those directions which are determined on the basis of a rider who sits on a bicycle seat of a bicycle with facing a bicycle handlebar.

First Embodiment

<General Configuration of a Bicycle>

Figure 1:
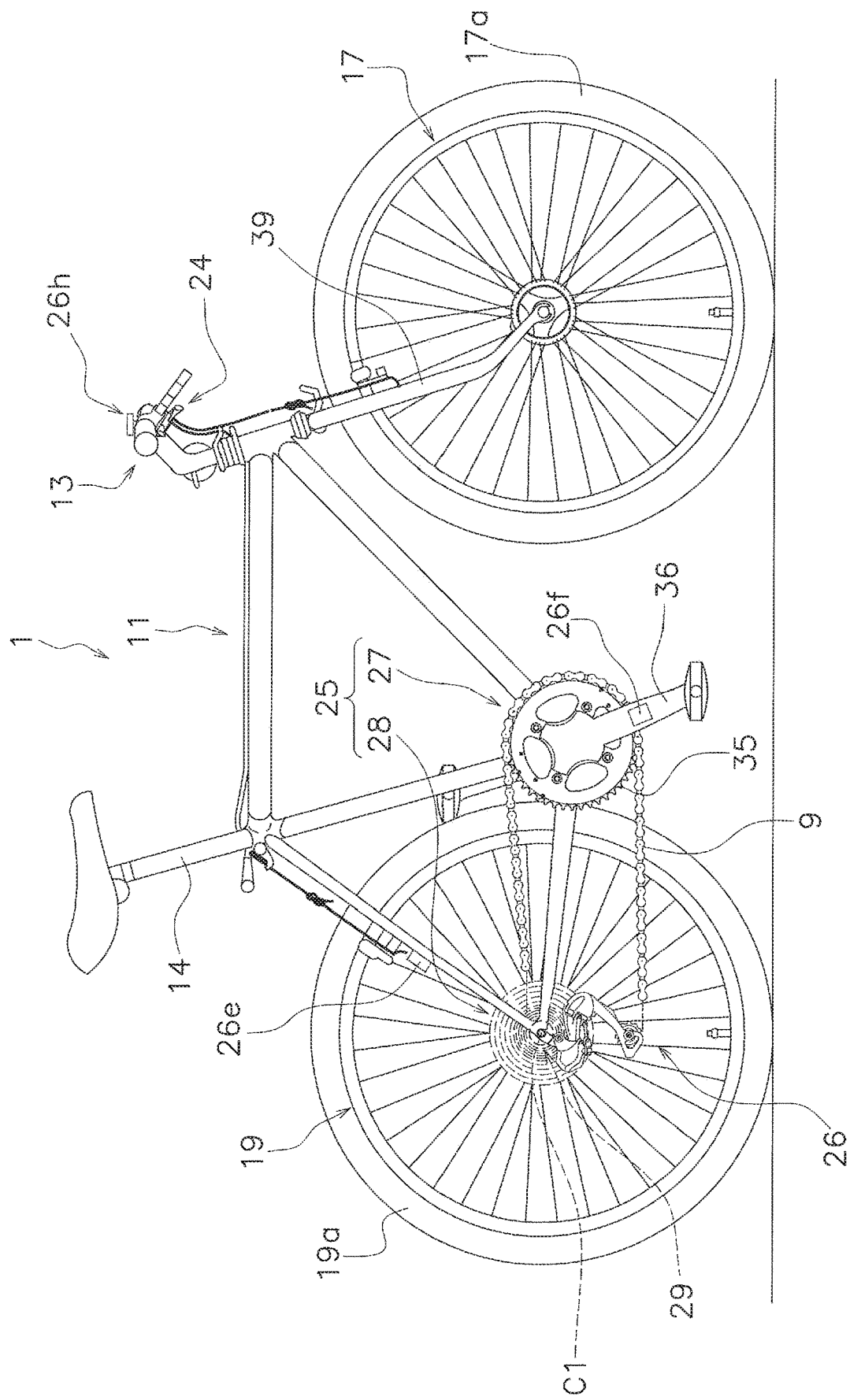
FIG. 1 is a side view of a bicycle according to a first embodiment of the present invention.
Figure 2:
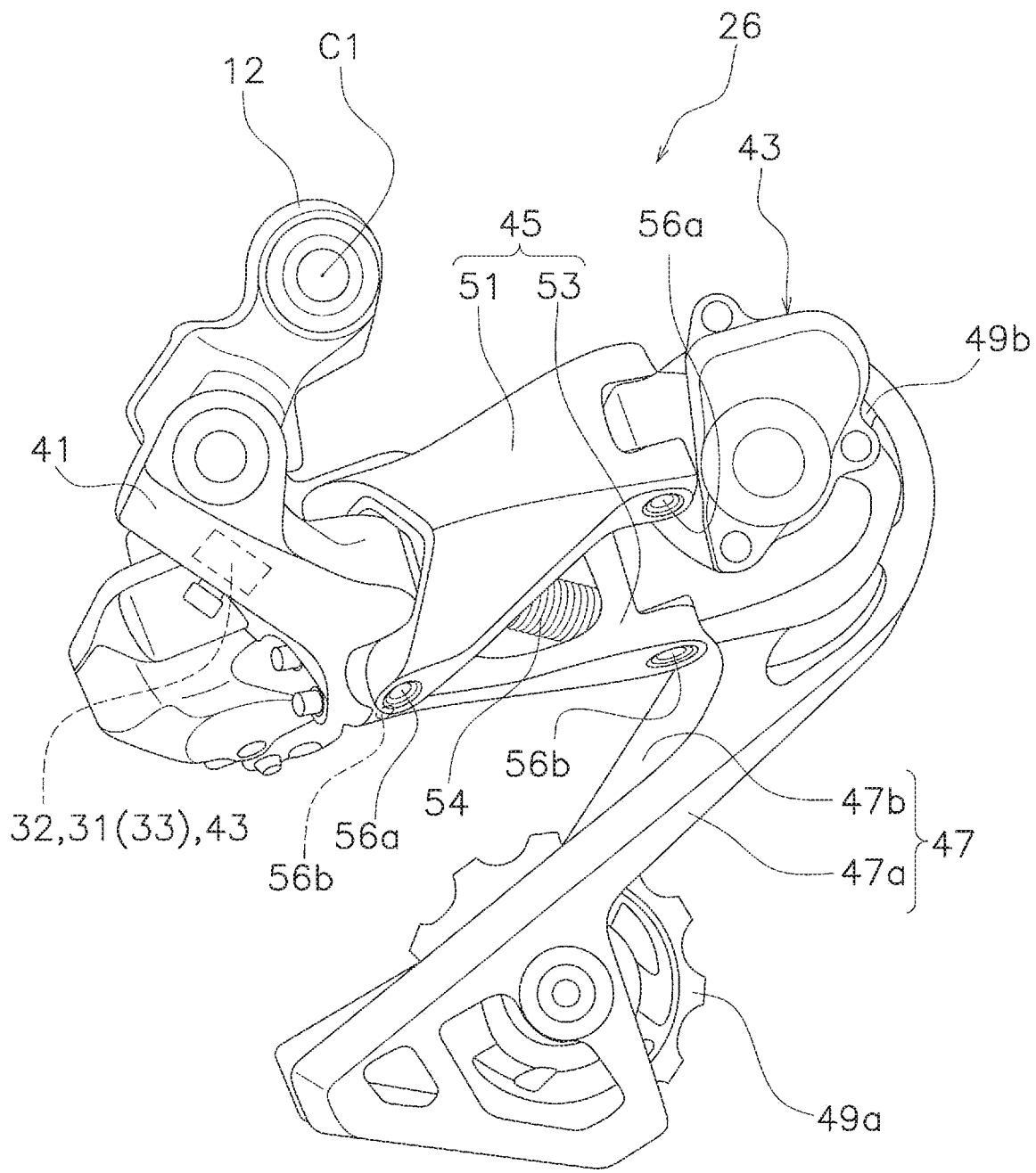
FIG. 2 is a side view from outside of the bicycle rear derailleur according to the first embodiment of the present invention.

As shown FIG. 1, a bicycle 1 includes a bicycle chain 9, a bicycle frame 11, a handle 13, front and rear wheels 17, 19, a shifting device 24, a drive train 25 and a front fork 39. The bicycle 1 further includes a bicycle electric rear derailleur 26. The bicycle 1 further includes a bicycle transmission control device 32 (see FIG. 2).

The front fork 39 is rotatably attached to the bicycle frame 11. The handle 13 is fixed to the front fork 39. The front wheel 17 is rotatably attached to the front fork 39. The rear wheel 19 is rotatably attached to a rear portion of the bicycle frame 11 via a rear hub assembly 29. A front tire 17a is attached to the front wheel 17. A rear tire 19a is attached to the rear wheel 19.

The shifting device 24 is attached to the handle 13. The shifting device 24 operates the bicycle electric rear derailleur 26.

The bicycle electric rear derailleur 26 is attached to the bicycle frame 11. The bicycle electric rear derailleur 26 moves the bicycle chain 9 from one rear sprocket of a bicycle rear sprocket assembly 28 to another rear sprocket of the bicycle rear sprocket assembly 28 by operating a shifting device 24. The bicycle rear sprocket assembly 28 includes a rotational center axis C1. The rear sprockets are shown by a simplified description in FIG. 1.

The drive train 25 mainly includes a crank assembly 27, the bicycle rear sprocket assembly 28, the bicycle chain, and the bicycle electric rear derailleur 26. Specifically, the drive train 25 mainly includes a crank assembly 27, a rear hub assembly 29, and the bicycle rear sprocket assembly 28. The drive train 25 may further include the front sprocket 35.

The crank assembly 27 is rotatably supported on a lower portion of the bicycle frame 11 than a seat post 14. The crank assembly 27 includes at least one front sprocket 35 and a pair of crank arms 36. The at least one front sprocket 35 may include a plurality of front sprockets. In this case, the bicycle chain 9 moves on the plurality of front sprockets by operation of a bicycle front derailleur.

In this embodiment, the crank assembly 27 includes a front sprocket 35 which engages with the bicycle chain 9. A pedal is attached to each of the pair of the crank arms 36.

The rear hub assembly 29 is mounted on the rear portion of the bicycle frame 11. The rear hub assembly 29 supports the bicycle rear sprocket assembly 28.

<General Configuration of the Bicycle Electric Rear Derailleur)

The bicycle electric rear derailleur 26 comprises the base member 41, the movable member 43, and the linkage structure 45. The bicycle electric rear derailleur 26 further comprises a chain guide. The chain guide includes a pair of chain-guide plates 47a, 47b and a pair of pulleys 49a, 49b. The pair of chain guide plates includes an outer guide plate 47a and an inner guide plate 47b. The pulleys include a tension pulley 49a and a guide pulley 49b. The pulleys 49a, 49b are disposed between the pair of chain guide plates 47a, 47b. The linkage structure 45 further includes a coil spring 54 disposed between the outer link plate 51 and the inner link plate 53.

The bicycle electric rear derailleur 26 further comprises an electronic actuator unit 31. A rear wheel sensor 26e is attached to the bicycle frame 11. A power meter unit 26f is attached to the crank assembly 27. The rear wheel sensor 26e is configured to detect a rotation number of the rear wheel 19 by the power meter unit 26f. The bicycle electric rear derailleur 26 further comprises a battery unit 26g. The battery unit 26g is disposed on the base member 41. The battery unit 26g may be arranged at a position separated from the bicycle rear derailleur 26 and supply electric power to various device via an electric cable. The battery unit 26g may be disposed on at least one of the movable member 45, the linkage structure 45, and the chain guide 47.

The bicycle electric rear derailleur 26 is operated by the shifting device 24. The bicycle electric rear derailleur 26 is driven by the electronic actuator unit 31, when the shifting device 24 is operated.

The bicycle electric rear derailleur 26 includes a derailleur controller 32b and a wireless communication unit 26i. The wireless communication unit 26i is disposed on the base member 41. The wireless communication unit 26i may be disposed on at least one of the movable member 45, the linkage structure 45, and the chain guide 47.

The wireless communication unit 26i is configured to receive a signal on the shifting operation from an additional wireless communication unit 30. The additional wireless communication unit 30 is provided on the bicycle 1 and connected to the shifting device 24. The derailleur controller 32b is configured to operate the electronic actuator unit 31 based on the signal. The electronic actuator unit 31, for example, an electric motor 33 is disposed on the base member 41.

The signal may be transmitted from the shifting device 24 to the derailleur controller 32b via an electric cable without the wireless communication unit 26i and the additional wireless communication unit 30.

The configuration of the bicycle electric rear derailleur 26 is briefly described, because the configuration is the same as that of the conventional bicycle electronic rear derailleur.

The base member 41 is configured to be mounted to the bicycle frame 11. The base member 41 is directly or indirectly mounted to the bicycle frame 11. In this embodiment, the base member 41 is attached to the bicycle frame 11 via an attachment member 12. The base member 41 is fixed on a rear portion of the bicycle frame 11 via an attachment member 12.

The movable member 43 is configured to be movable with respect to the base member 41. For example, the movable member 43 moves with respect to the base member 41 via the linkage structure 45. The movable member 43 pivotably supports the chain guide 47.

The linkage structure 45 is configured to operatively couple the base member 41 to the movable member 43. The linkage structure 45 is disposed between the base member 41 and the movable member 43. The linkage structure 45 is pivotably connected to each of the base member 41 and the movable member 43. The linkage structure 45 forms a link mechanics with the base member 41 and the movable member 43.

The linkage structure 45 includes a first link member 51 and a second link member 53. The first link member 51 and second link members 53, both of first link member and the second link member are pivotably attached to each of the base member 41 and the movable member 43. The second link member 53 is disposed so as to face the first link member 51. The second link member 53 is disposed at an interval from the first link member 51.

The chain guide 47 is pivotably mounted on the movable member 43. The pair of pulleys 49a, 49b is disposed between the outer guide plate 47a and the inner guide plate 47b. The pair of pulleys 49a, 49b is rotatably mounted on the pair of chain guide plates 47a, 47b. The pair of pulleys 49a, 49b may be rotatably mounted on at least one of the outer guide plate 47a and the inner guide plate 47b.

The coil spring 54 is configured to bias the movable member 43 toward the outward from the bicycle flame to the smallest sprocket of the bicycle rear sprocket assembly 28 in a state where the rear sprocket assembly and the electric rear derailleur are assembled with the bicycle frame. The coil spring 54 connects the first link member 51 and the second link member 53. The coil spring 54 connects a link shaft 56a1 and a link shaft 56b1. The link shaft 56a1 connects the first link member 51 to the base member 41. The link shaft 56a2 connects the first link member 51 to the movable member 53. The link shaft 56b1 connects the second link member 53 to the base member 41. The link shaft 56b2 connects the second link member 53 to the movable member 43.

The electronic actuator unit 31 is mounted on the base member 41. For example, the electronic actuator unit 31 is mounted in an interior space of the base member 41. The electronic actuator unit 31 can be mounted in an interior space of the movable member 43. The electronic actuator unit 31 can be mounted in an interior space of a linkage structure 45.

The electronic actuator unit 31 is configured to operate the linkage structure 45. The electric actuator unit 31 is configured to operate to move the movable member with respect to the base member 41. The electronic actuator unit 31 includes an electric motor 33. For example, the electric motor 33 is a driving source for operating the linkage structure 45 or the movable member with respect to the base member 41. The electronic actuator unit 31 can further includes a reduction mechanism. In this case, the reduction gear mechanism includes a plurality of gears. The plurality of gears may include combination of at least one of spur gear and at least one of worm gear. The plurality of gears may include a planetary gear mechanism.

The rear wheel sensor 26e is used for calculating a running speed of the bicycle 1. For example, the rear wheel sensor 26e is configured to detect the rotation number of the rear wheel 19. The rear wheel sensor 26e is attached to the bicycle frame 11 (see FIG. 1). The rear wheel sensor 26e may be attached to the rear wheel. The rear wheel sensor 26e includes a magnet sensor. The rear wheel sensor 26e is attached to the bicycle frame 11. The rear wheel sensor 26e detects magnetic force of a magnet which is attached to the rear wheel 19.

The rear wheel sensor 26e outputs the rotation number of the rear wheel 19 to a controller 32b and a memory 32a. The controller 32b calculates the running speed based on the rotation number of the rear wheel 19.

Instead of the rear wheel sensor 26e, a front wheel sensor may be used for calculating the running speed of the bicycle 1. The front wheel sensor is configured to detect a rotational speed or a rotational number of the front wheel 17.

In case that the front wheel sensor detects the rotational number of the front wheel 17, the running speed is calculated based on a diameter of the front tire 17a, a perimeter of the front tire 17a, a diameter of the front wheel 17, a perimeter of the front wheel 17, and the like. The diameter of the front tire 17a, the perimeter of the front tire 17a, the diameter of the front wheel 17, and the perimeter of the front wheel 17 is recorded on the memory 32a. The front wheel sensor is attached to at least one of the bicycle frame 11 and the front wheel.

The running speed may be calculated by an external device such as a cycle computer 26h, a smart phone and the like, which includes a GPS (Global Positioning System) receiver.

The power meter unit 26f is used for calculating a cadence. For example, the power meter unit 26f is configured to detect a power data working the crank assembly 27, for example, at least one of the crank arms 36.

The power meter unit 26f is attached to the crank assembly 27, for example, at least one of the crank arms 36. The power meter unit 26f outputs the power data to the controller 32b and the memory 32a. The controller 32b calculates the cadence of the crank arms 36 based on the power data.

The power meter unit 26f is driven by a battery. The battery can be comprised as a power meter unit 26f. The battery supplies electric power to the power meter unit 26f. Preferably, the battery is detachably mounted to the power meter unit 26f.

The battery unit 26g supplies electric power to various device for operating the bicycle electric rear derailleur 26. For example, the battery unit 26g supplies the electric power to the controller 32b, the memory 32a, the electronic actuator unit 31, and the rear wheel sensor 26e, and the like.

The battery unit 26g is disposed on at least one of the base member 41, the movable member 43, the linkage member 26c, the bicycle frame 11, a seat post, and a handle bar. In this embodiment, the battery unit 26g is disposed on the movable member 43 (see FIG. 2).

Preferably, the battery unit 26g is detachably mounted to the at least one of the base member 41, the movable member 43, the linkage member 26c, the bicycle frame 11, a seat post, and a handle bar. In this embodiment, the battery unit 26g is detachably mounted to the base member 41.

<Bicycle Transmission Control Device>

Figure 3:
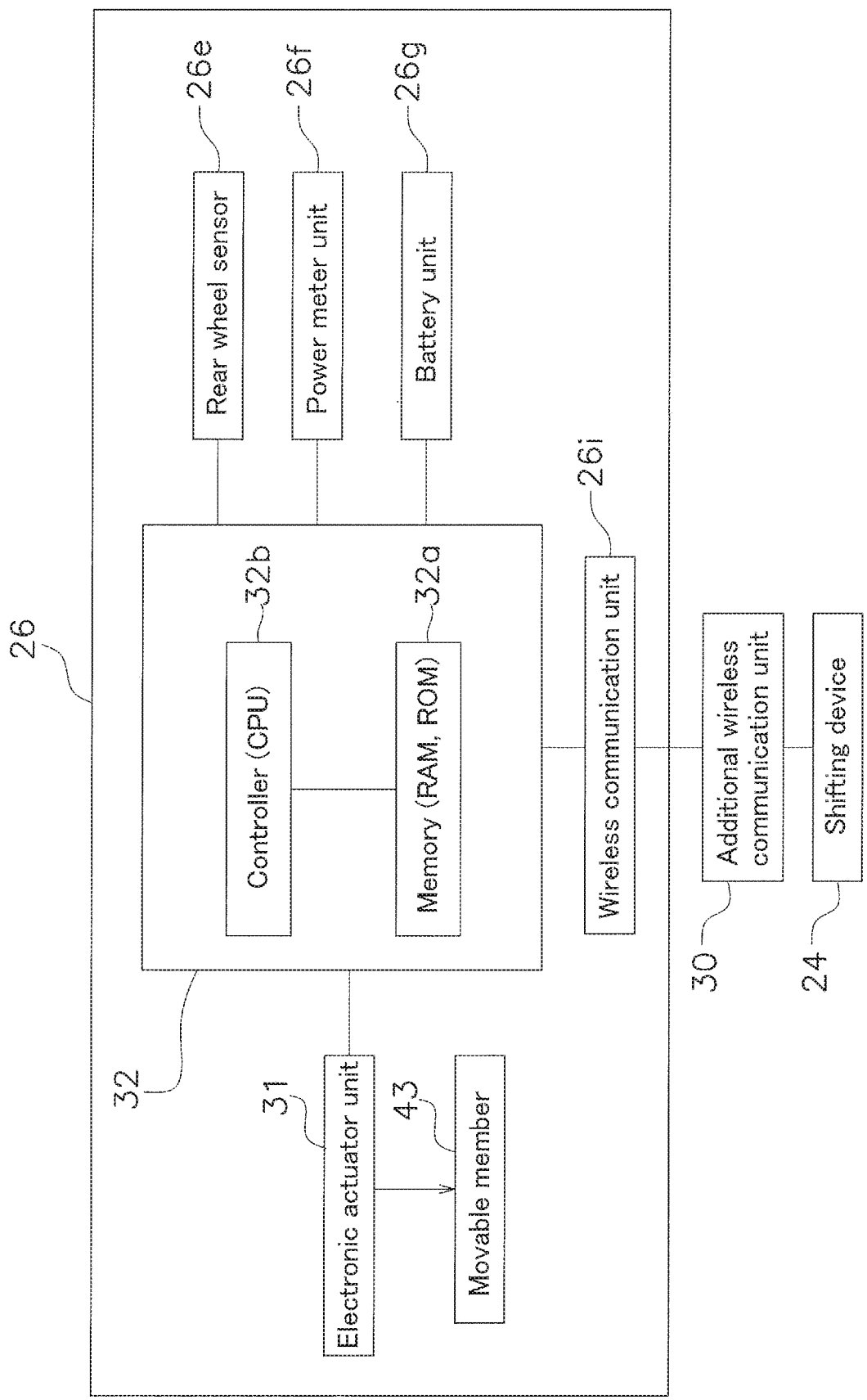
FIG. 3 is a function block diagram of the bicycle rear sprocket assembly according to the first embodiment of the present invention.

As shown in FIG. 3, the bicycle transmission control device 32 comprises the controller 32b. The bicycle transmission control device 32 further comprises the memory 32a. In this embodiment, the bicycle transmission control device 32 comprises the controller 32b and the memory 32a.

The bicycle transmission control device 32 is disposed in the bicycle electric rear derailleur 26. For example, the bicycle transmission control device 32 is attached to at least one of the base member 41, the movable member 43, and the linkage structure 45. In this embodiment, the bicycle transmission control device 32 is attached to the base member 41 (see FIG. 2). The bicycle transmission control device 32 may be attached to at least one of the cycle computer 26h, the battery unit 26g, and a main battery unit or sub-battery unit which is different from the battery unit 26g.

(Memory)

The memory 32a is configured to store the control program for operating the bicycle electric rear derailleur 26. The memory 32a is configured to further store an information data for performing the control program.

As shown in FIG. 3, the memory 32a includes ROM (Read Only memory) and RAM (Random access memory). For example, ROM stores control program and various types of information data requested for performing the control program. RAM temporarily stores the information data when the control program is performed.

For example, the memory 32a is configured to store a related information with respect to a running speed of the bicycle 1 and a gear ratio of the bicycle 1. The related information is included in the above information data.

The related information includes a first table (an example of a table). The first table is used for defining a first region R1 and a second region R2 (see FIGS. 4A and 4B). The first table includes the first region R1 and the second region R2 that is delimited from the first region R1 by a boundary BD. The boundary BD is changed depending on the cadence of the crank arms 36 of the bicycle.

Figure 4A:
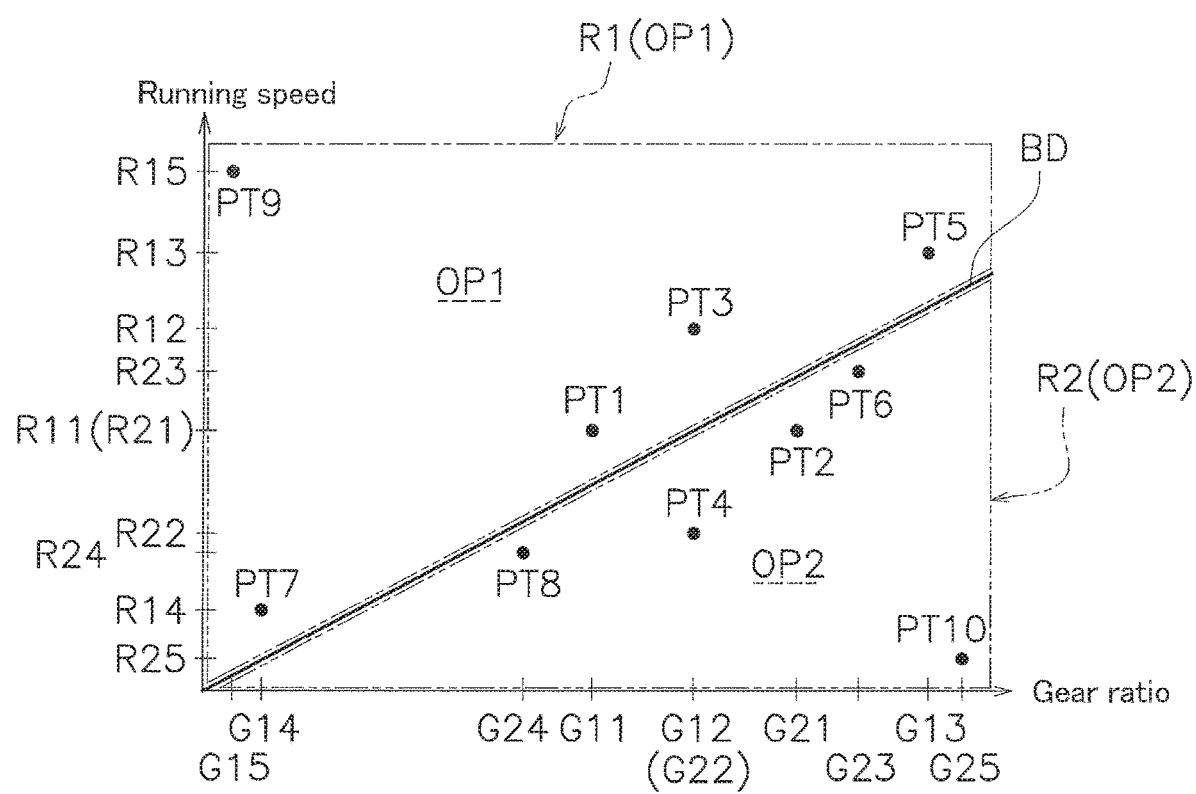
FIG. 4A is a figure for explaining a table setting an operating speed according to relationship between a running speed and a gear ratio according to the first embodiment of the present invention.
Figure 4B:
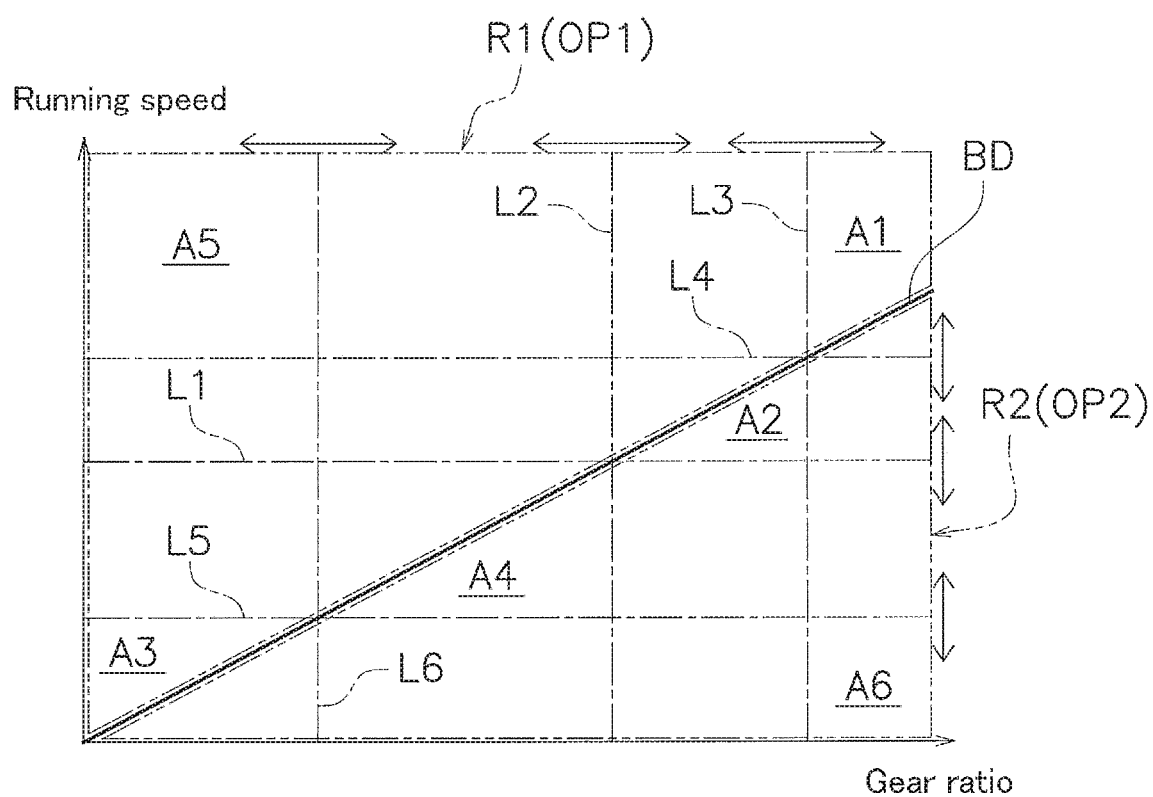
FIG. 4B is a figure for explaining a table setting an operating speed according to relationship between a running speed and a gear ratio according to the first embodiment of the present invention.

The operating speed is associated with each of the first region R1 and the second region R2. As shown in FIGS. 4A and 4B, the operating speed includes a first operating speed OP1 and a second operating speed OP2 that is different from the first operating speed OP1.

For example, the operating speed is the first operating speed OP1 in the first region R1. The operating speed is a second operating speed OP2 in the second region R2. Specifically, the operating speed is set to the first operating speed OP1 in the first region R1. The operating speed is set to the second operating speed OP2 in the second region R2.

The related information can be defined by a function. In this case, the first operating speed OP1 and second operating speeds OP2 are calculated by the function. For example, the function is expressed by a mathematical formula, for example, $RS=f(BS, GR, CD)$.

A symbol "RS" indicates the first operating speed OP1 and second operating speeds OP2 of the bicycle electric rear derailleur 26. A symbol "BS" indicates the running speed of the bicycle 1. A symbol "GR" indicates the gear ratio of the bicycle 1. A symbol "CD" indicates the cadence of the crank arms 36.

The memory 32a is disposed in bicycle electric rear derailleur 26. For example, the memory 32a is disposed in at least one of the base member 41, the movable member 43, and the linkage member 26c. In this embodiment, the memory 32a is disposed in the base member 41.

(Controller)

As shown in FIG. 3, the controller 32b includes a CPU (Central Processing Unit). The controller 32b performs the control program based on the information data of the memory 32a.

The controller 32b is configured to control the bicycle electric rear derailleur 26 by performing the control program based on the information data in the memory 32a. Specifically, the controller 32b is configured to operate the electric motor 33 by performing the control program based on the information data in the memory 32a. As a result, the bicycle electric rear derailleur 26 is controlled by the controller 32b.

The controller 32b configured to control the operating speed of the bicycle electric rear derailleur 26 based on the running speed of the bicycle 1 and the gear ratio of the bicycle 1.

For example, the controller 32b is configured to control the operating speed of the bicycle electric rear derailleur 26 by controlling the electronic actuator unit 31 based on the running speed of the bicycle 1 and the gear ratio of the bicycle 1. More specifically, the controller 32b is configured to control the operating speed of the bicycle electric rear derailleur 26 by controlling the electronic motor 33 based on the running speed of the bicycle 1 and the gear ratio of the bicycle 1.

The controller 32b is configured to receive the signal concerning the rotation number of the rear wheel 19 from the rear wheel sensor 26e. The controller 32b is configured to calculate the running speed of the bicycle 1 based on the signal concerning the rotation number. The controller 32b records the running speed the memory 32a.

The running speed of the bicycle 1 can be calculated based on a signal receiving from a GPS receiver. In this case, the GPS receiver is attached to the bicycle frame 11.

The running speed of the bicycle 1 can be set based on a signal receiving from the external device such as the cycle computer 26h, the smart phone and the like. The external device includes the GPS receiver. In this case, for example, the running speed is calculated by a controller of the external device based on a GPS data of the GPS receiver. The running speed outputs from the controller of the external device to the controller 32b of the bicycle electric rear derailleur 26.

The controller 32b is configured to receive a signal receiving from the shifting device 24. The controller 32b is configured to recognize the gear ratio of the bicycle 1 based on the shift transmission signal receiving from the shifting device 24. The controller 32b records the gear ratio on the memory 32a.

The shift transmission signal includes an information of the gear ratio (a shift gear stage). The gear ratio (the shift gear stage) may be detected by a sensor provided on the bicycle electric rear derailleur 26.

The gear ratio can be calculated based on a signal receiving from the sensor which detects a rotation information of an output shaft of the electronic actuator unit 31. The sensor is arranged near the output shaft.

For example, the output shaft of the electronic actuator unit 31 includes the output shaft of the electric motor 33 or the output shaft of the reduction gear mechanism. The output shaft of the electronic actuator unit 31 includes both of the output shaft of the electric motor 33 and the output shaft of the reduction gear mechanism. The controller 32b recognizes the gear ratio by calculating position of the movable member 43 with respect to the base member 41 based on the rotation information.

The gear ratio can be calculated based on a signal receiving from a sensor (e.g. an encoder gear) which detects a rotation information of at least one gear of the reduction gear mechanism. The gear ratio is calculated by detecting a rotational amount or a rotational position of the output shaft of the electric motor 33 with the sensor.

The gear ratio can be calculated based on a signal receiving from a sensor which detects position and/or angle of the chain guides 47a, 47b with respect to the movable member 43. The sensor is disposed on the chain guide 47 and the movable member 43. The controller 32b recognizes the gear ratio by calculating position of the movable member 43 with respect to the base member 41 based on the rotation information.

The controller 32b is configured to receive a signal receiving from the power meter unit 26f. The controller 32b is configured to calculate the cadence of the crank arms 36 the cadence based on the signal receiving from the power meter unit 26f. For example, the controller 32b calculates the crank rotation number per minute based on the power data of the power meter unit 26f. The controller 32b records the crank rotation number per minute as the cadence on the memory 32a.

The controller 32b may be configured to receive a signal receiving from a cadence sensor which is attached to the crank arm 36 or the rear hub assembly 29 of the rear wheel 19.

The controller 32b is configured to change the boundary BD depending on the cadence of the crank arms 36 of the bicycle 1. For example, the controller 32b sets the first region R1 and the second region R2 by changing the boundary BD depending on the cadence. The controller 32b sets the first operating speed OP1 and the second operating speed OP2 to the first region R1 and the second region R2 respectively.

<Detailed Description of the Operating Speed>

The controller 32b is configured to control the operating speed so that the operating speed is the first operating speed OP1 in a state where the running speed is a predetermined running speed and the gear ratio is a predetermined gear ratio.

In case that the operating speed is the first operating speed OP1, for example, the bicycle electric rear derailleur 26 moves the bicycle chain 9 from one rear sprocket to another rear sprocket. In this case, position of a shift transmission gate of the rear sprocket may not consider during the operation of the bicycle electric rear derailleur 26.

The controller 32b is configured to control the operating speed so that the operating speed is the second operating speed OP2 in a state where the running speed is the predetermined running speed and the gear ratio is the predetermined gear ratio.

In case that the operating speed is the second operating speed OP2, for example, the bicycle electric rear derailleur 26 moves the bicycle chain 9 from one rear sprocket to another rear sprocket via the shift transmission gate.

For example, the controller 32b is configured to control the operating speed so that the operating speed is the first operating speed OP1 in a state where the running speed is a predetermined running speed and the gear ratio is a predetermined gear ratio while a cadence of the crank arms 36 of the bicycle is a first cadence.

The controller 32b is configured to control the operating speed so that the operating speed is the second operating speed OP2 in a state where the running speed is the predetermined running speed and the gear ratio is the predetermined gear ratio while the cadence of a crank arms 36 of the bicycle is a second cadence that is different from the first cadence.

Specifically, the controller 32b is configured to control the operating speed so that the operating speed is the first operating speed OP1 in a state where the running speed is a first running speed and the gear ratio is a first gear ratio.

The controller 32b is configured to control the operating speed so that the operating speed is the second operating speed OP2 in a state where the running speed is a second running speed and the gear ratio is a second gear ratio.

In this embodiment, the operating speed is defined by an operating speed of the bicycle electric rear derailleur 26. More specifically, the operating speed is defined by an operating speed of the electronic actuator unit. The operating speed is controlled by the controller 32b. The controller 32b controls the electronic actuator unit 31 so that the operating speed changes according to the running speed and the gear ratio.

The operating speed can be defined by a moving period of the bicycle electric rear derailleur 26. The moving period corresponds to the time from the start of the transmission to the completion of the transmission.

For example, in case that the bicycle electric rear derailleur 26 allow the bicycle chain 9 to move between at least three rear sprockets, the controller 32b controls the electronic actuator unit 31 so that the moving speed is constant and waiting time of the bicycle chain 9 on the intermediate rear sprocket(s) changes according to the running speed and the gear ratio.

Thus, the controller 32b controls the electronic actuator unit 31 so that the first operating speed OP1 is different from the second operating speed OP2 by the change of the waiting time.

As shown in FIGS. 4A and 4B, the first operating speed OP1 is defined in the first region R1 which is upper than the boundary BD. The second operating speed OP2 is defined in the second region R2 which is lower than the boundary BD. The boundary BD is included in the first region R1 or the second region R2.

The first operating speed OP1 is directly determined based on the running speed and the gear ratio, for example, the first running speed and the first gear ratio. The second operating speed OP2 is directly determined based on the running speed and the gear ratio, for example, the second running speed and the second gear ratio.

For example, the first operating speed OP1 and second operating speed OP2 are directly determined by the first table based on the running speed and the gear ratio without reference to the cadence. Range of the running speed and the gear ratio of the first table for setting the first operating speed OP1 and second operating speed OP2 is changed according to the boundary BD. For example, the range of the running speed and the gear ratio of the first table for setting the first operating speed OP1 and second operating speed OP2 is changed according to the cadence.

(Setting of the Operating Speed)

As shown in FIGS. 4A and 4B, the operating speed is set according to relationship between the running speed and the gear ratio. FIGS. 4A and 4B shows a graph defined by the first table. The boundary BD is a line defined by the cadence.

(1) The first running speed R11 is equal to the second running speed R21. The first gear ratio G11 is different from the second gear ratio G21. For example, as shown in FIG. 4A, the first gear ratio G11 is smaller than the second gear ratio G21. The first operating speed OP1 is larger than the second operating speed OP2. This condition is indicated by a sign "PT1" on FIG. 4A. The first operating speed OP1 of the first region R1 is larger than the second operating speed OP2 of the second region R2.

As shown in FIG. 4A, the second gear ratio G21 is larger than the first gear ratio G11. The second operating speed OP2 is smaller than the first operating speed OP1. This condition is indicated by a sign "PT2" on FIG. 4A. The second operating speed OP2 of the second region R2 is smaller than the first operating speed OP1 of the first region R1.

As shown in FIG. 4B, this condition is defined on a line L1 in a graph which corresponds to the first table. The line L1 moves up and down along a vertical axis in the graph. For example, the line L1 moves up and down along a running speed axis in the graph.

(2) The first running speed R12 is different from the second running speed R22. The first gear ratio G12 is equal to the second gear ratio G22.

For example, as shown in FIG. 4A, the first running speed R12 is larger than the second running speed R22. The first operating speed OP1 is larger than the second operating speed OP2. This condition is indicated by a sign "PT3" on FIG. 4A.

As shown in FIG. 4A, the second running speed R22 is smaller than the first running speed R12. The second operating speed OP2 is smaller than the first operating speed OP1. This condition is indicated by a sign "PT4" on FIG. 4A.

(3) The first running speed R13 is different from the second running speed R23. The first gear ratio G13 is different from the second gear ratio G23.

(3-1) For example, as shown in FIG. 4A, the first running speed R13 is larger than the second running speed R23. The first gear ratio G13 is larger than the second gear ratio G23. The first operating speed OP1 is larger than the second operating speed OP2. This condition is indicated by a sign "PT5" on FIG. 4A.

The first operating speed OP1 of the first region R1 is larger than the second operating speed OP2 of the second region R2.

As shown in FIG. 4A, the second running speed R23 is smaller than the first running speed R13. The second gear ratio G23 is smaller than the first gear ratio G13. The second operating speed OP2 is smaller than the first operating speed OP1. This condition is indicated by a sign "PT6" on FIG. 4A. The second operating speed OP1 of the second region R2 is smaller than the first operating speed OP1 of the first region R1.

As shown in FIG. 4B, this condition may define as follows. For example, this condition defines a first area A1 and a second area A2. "PT5" is defined in the first area A1 and "PT6" is defined in the second area A2. The first area A1 is formed by the boundary BD in the graph. The line L3 moves from side to side along the horizontal axis on the graph. For example, the line L3 moves from side to side along the gear ratio axis on the graph. Size of the first area A1 changes according to movement of the line L3.

For example, the second area A2 is formed by the line L3 and the boundary BD. The line L3 moves from side to side along the horizontal axis on the graph. For example, the line L3 moves from side to side along the gear ratio axis on the graph. Size of the second area A2 changes according to movement of the line L4.

The first area A1 and the second area A2 are examples and "PT5" and "PT6" may be respectively defined in an area except for the first area A1 and the second area A2 as far as "PT5" and "PT6" satisfy the above relationship.

(3-2) For example, as shown in FIG. 4A, the first running speed R14 is smaller than the second running speed R24. The first gear ratio G14 is smaller than the second gear ratio G24. The first operating speed OP1 is larger than the second operating speed OP2. This condition is indicated by a sign "PT7" on FIG. 4A For example, as shown in FIG. 4A, the second running speed R24 is larger than the first running speed R14. The second gear ratio G24 is larger than the first gear ratio G14. The second operating speed OP2 is smaller than the first operating speed OP1. This condition is indicated by a sign "PT8" on FIG. 4A As shown in FIG. 4B, this condition may define as follows. For example, this condition defines a third area A3 and a fourth area A4. "PT7" is defined in the third area A3 and "PT8" is defined in the fourth area A4. The third area A3 is formed by a line L5 and the boundary BD in the graph. The line L5 moves up and down along the vertical axis on the graph. For example, the line L5 moves up and down along the running speed axis on the graph. Size of the third area A3 changes according to movement of the line L5.

For example, the fourth area A4 is formed by the line L5 and the boundary BD in the graph. The line L5 moves up and down along the vertical axis on the graph. For example, the line L5 moves up and down along the running speed axis on the graph. Size of the fourth area A4 changes according to movement of the line L2.

The third area A3 and the fourth area A4 are examples and "PT7" and "PT8" may be respectively defined in an area except for the third area A3 and the fourth area A4 as far as "PT7" and "PT8" satisfy the above relationship.

(4) The first running speed R15 is different from the second running speed R25. The first gear ratio G15 is different from the second gear ratio G25. For example, the first running speed R15 is different from the second running speed R25. The first gear ratio G15 is different from the second gear ratio G25.

For example, as shown in FIG. 4A the first running speed R15 is larger than the second running speed R25. The first gear ratio G15 is smaller than the second gear ratio G25. The first operating speed OP1 is larger than the second operating speed OP2. This condition is indicated by a sign "PT9" on FIG. 4A For example, as shown in FIG. 4A the second running speed R25 is smaller than the first running speed R15. The second gear ratio G25 is larger than the first gear ratio G15. The second operating speed OP2 is smaller than the first operating speed OP1. This condition is indicated by a sign "PT10" on FIG. 4A. The second operating speed OP2 of the second region R2 is larger than the first operating speed OP1 of the first region R1.

As shown in FIG. 4B, this condition may define as follows. For example, this condition defines a fifth area A5 and a sixth area A6. "PT9" is defined in the third area A5 and "PT10" is defined in the fourth area A6. The fifth area A5 is formed by the line L4 and the line L6 in the graph.

The line L4 moves up and down along the vertical axis on the graph. For example, the line L4 moves up and down along the running speed axis on the graph. The line L6 moves from side to side along the horizontal axis on the graph. For example, the line L6 moves from side to side along the gear ratio axis on the graph. Size of the fifth area A5 changes according to movement of the lines L4, L6.

For example, the sixth area A6 is formed by the line L3 and the line L5 in the graph. The line L3 moves from side to side along the horizontal axis on the graph. For example, the line L3 moves from side to side along the gear ratio axis on the graph. The line L5 moves up and down along the vertical axis on the graph. For example, the line L5 moves up and down along the running speed axis on the graph. Size of the sixth area A6 changes according to movement of the lines L3, L5.

The fifth area A5 and the sixth area A6 are examples and "PT9" and "PT10" may be respectively defined in an area except for the fifth area A5 and the sixth area A6 as far as "PT9" and "PT10" satisfy the above relationship.

In the first embodiment, rapid transmission responsiveness is ensured by the first operating speed OP1 in the first region R1, when it is difficult to transmit a torque from the crank to the bicycle rear sprocket assembly 28. Conventional transmission responsiveness is ensured by the second operating speed OP2 in the second region R2.

Variation of the First Embodiment

As a variation of the above embodiment, the bicycle transmission control device 32 can be configured as follows.

The bicycle transmission control device 32 comprises the controller 32b configured to control the operating speed of the bicycle derailleur based on the running speed of the bicycle and the gear ratio of the bicycle.

Figure 5:
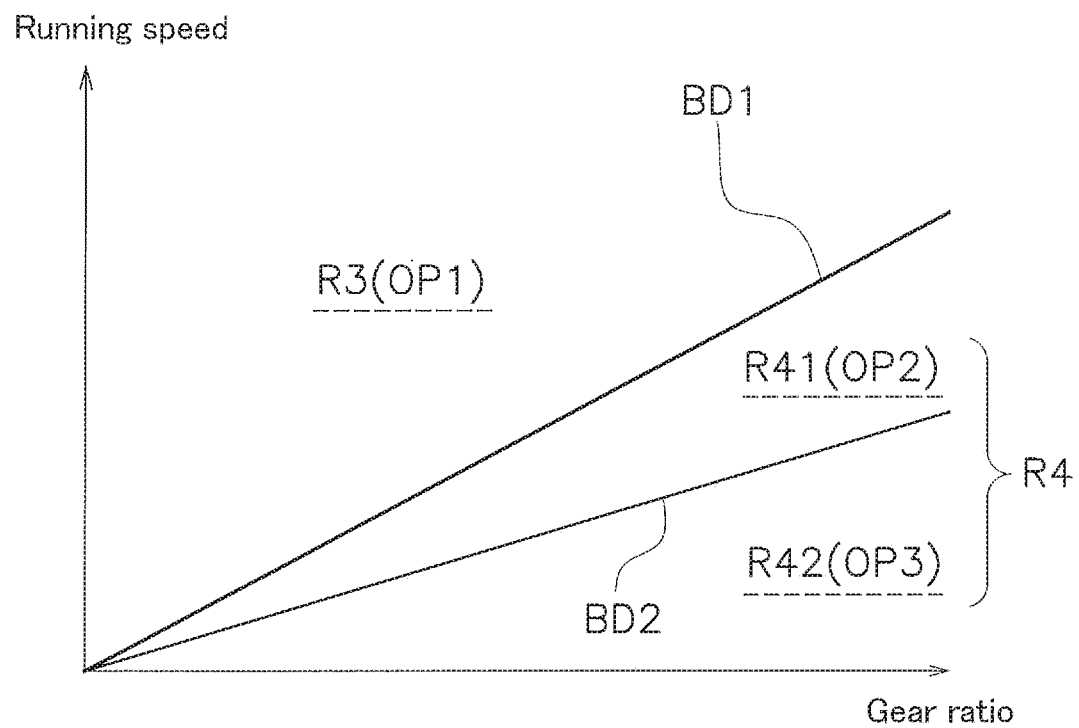
FIG. 5 is a figure for explaining a table setting an operating speed according to relationship between a running speed and a gear ratio according to a variation of the first embodiment of the present invention.

As shown in FIG. 5, the operating speed includes a first operating speed OP1, a second operating speed OP2 and a third operating speed OP3.

Each of the first operating speed OP1 and the third operating speed OP3 is different from the second operating speed OP2. The first operating speed OP1 is different from the third operating speed OP3. The first operating speed OP1 may be the same as the third operating speed OP3.

The first operating speed OP1 is larger than the second operating speed OP2. The third operating speed OP3 is larger than the second operating speed OP2. One of the first and third operating speeds OP1, OP3 is equal to or larger than the other of the first and third operating speeds OP1, OP3.

The related information includes a second table. The second table is used for defining a third region R3 and a fourth region R4. The second table includes the third region R3 and the fourth region R4 that is delimited from the third region R3 by a first boundary BD1. The first boundary BD1 is set by the cadence of the crank arms 36 of the bicycle. The first operating speed OP1 is defined in the third region R3.

The fourth region R4 includes a first portion R41 and a second portion R42 that is delimited from the first portion R41 by a second boundary BD2. The second boundary BD2 is set to a predetermined value based on the cadence of the crank arms 36 of the bicycle.

The second operating speed OP2 and the third operating speed OP3 are defined in a fourth region R4. Specifically, the second operating speed OP2 is defined in the first portion R41 of the fourth region R4. The third operating speed OP3 is defined in the second portion R42 of the fourth region R4.

The controller 32b is configured to control the operating speed so that the operating speed is the first operating speed OP1 in a state where the running speed is the first running speed and the gear ratio is the first gear ratio.

The controller 32b is configured to control the operating speed so that the operating speed is the second operating speed OP2 in a state where the running speed is the second running speed and the gear ratio is the second gear ratio.

The controller 32b is configured to control the operating speed so that the operating speed is the third operating speed OP3 in a state where the running speed is a third running speed and the gear ratio is a third gear ratio.

For example, the second table is used when the bicycle runs down and up a hill. In case that the running speed is the first running speed and the gear ratio is the first gear ratio in the third region R3 when the bicycle runs down the hill, the controller 32b controls the operating speed so that the operating speed is the first operating speed OP1.

In case that the running speed is the second running speed and the gear ratio is the second gear ratio in the first portion R41 of the fourth region R4 when the bicycle start to run up the hill, the controller 32b controls the operating speed so that the operating speed is the second operating speed OP2.

In case that the running speed is the third running speed and the gear ratio is the third gear ratio in the second portion R42 of the fourth region R4 when the bicycle runs down and up the hill, the controller 32b controls the operating speed so that the operating speed is the third operating speed OP3.

In this embodiment, rapid transmission responsiveness is ensured by the first and third operating speeds OP1, OP3 in the first and third regions R1, R3, when it is difficult to transmit a torque from the crank to the bicycle rear sprocket assembly 28. Conventional transmission responsiveness is ensured by the second operating speed OP2 in the second region R2.

Second Embodiment

Specific explanation of the substantially same configuration as the first embodiment is omitted in the second embodiment. The description of the first embodiment is applied to the second embodiment about the description omitted below.

Figure 6A:
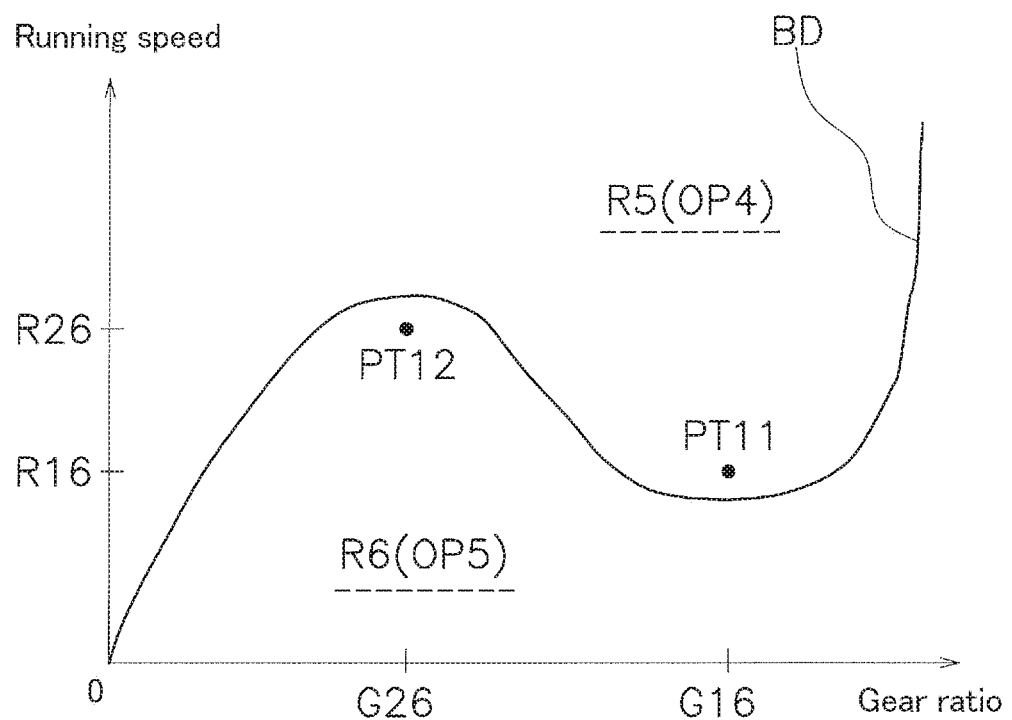
FIG. 6A is a figure for explaining a table setting an operating speed according to relationship between a running speed and a gear ratio according to the second embodiment of the present invention.

As shown in FIG. 6A, the operating speed includes the first operating speed OP5 and the second operating speed OP4 that is different from the first operating speed OP5.

The controller 32b is configured to control the operating speed so that the operating speed is the first operating speed OP5 in a state where the running speed is the first running speed R26 and the gear ratio is the first gear ratio G26.

The controller 32b is configured to control the operating speed so that the operating speed is the second operating speed OP4 in a state where the running speed is the second running speed R16 and the gear ratio is the second gear ratio G16.

The related information includes a third table. The third table is used for defining a fifth region R5 and a sixth region R6. The third table includes the fifth region R5 and the sixth region R6 that is delimited from the fifth region R5 by the boundary BD.

The fifth region R5 is provided in an upper region which is upper than the boundary BD. The sixth region R6 is provided in a lower region which is lower than the boundary BD.

The first operating speed OP5 is defined in the sixth region R6. The second operating speed OP4 is defined in the fifth region R5.

As shown in FIG. 6A, the operating speed is set according to relationship between the running speed and the gear ratio. FIG. 6A shows a graph defined by the third table. The boundary BD is a line defined by the cadence.

The first running speed R26 is different from the second running speed R16. The first gear ratio G26 is different from the second gear ratio G16. For example, as shown in FIG. 6A, the second running speed R16 is smaller than the first running speed R26. The second gear ratio G16 is larger than the first gear ratio G26. The second operating speed OP4 is larger than the first operating speed OP5. This condition is indicated by a sign "PT11" on FIG. 6A.

For example, the first running speed R26 is larger than the second running speed R16. The first gear ratio G26 is smaller than the second gear ratio G16.

The first operating speed OP5 is smaller than the second operating speed OP4. This condition is indicated by a sign "PT12" on FIG. 6A.

Figure 6B:
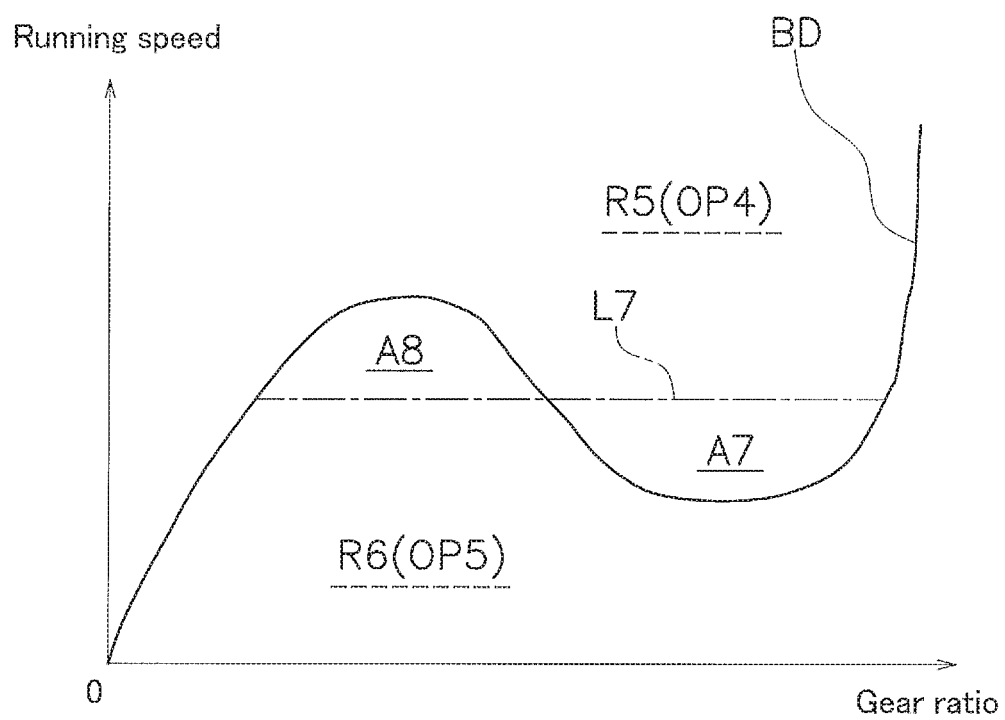
FIG. 6B is a figure for explaining a table setting an operating speed according to relationship between a running speed and a gear ratio according to the second embodiment of the present invention.

As shown in FIG. 6B, this condition may define as follows. For example, this condition defines a seventh area A7 and an eighth area A8. "PT11" is defined in the seventh area A7 and "PT12" is defined in the eighth area A8. The seventh area A7 is formed by a line L7 and the boundary BD in the fifth region R5. The eighth area A8 is formed by the line L7 and the boundary BD in the sixth region R6. The line L7 moves up and down along the vertical axis on the graph. For example, the line L7 moves up and down along the running speed axis on the graph. Sizes of the seventh area A7 and the eighth area A8 change according to movement of the line L7.

The second operating speed OP4 is larger than the first operating speed OP5 in the fifth region R5 except for the seventh area A7. The first operating speed OP5 is smaller than the second operating speed OP4 in the sixth region R6 except for the eighth area A8.

The seventh area A7 and the eighth area A8 are examples and "PT11" and "PT12" may be respectively defined in an area except for the seventh area A7 and the eighth area A8 as far as "PT11" and "PT12" satisfy the above relationship.

In the second embodiment, rapid transmission responsiveness is ensured by the second operating speed OP4 in the fifth region R5, when it is difficult to transmit a torque from the crank to the bicycle rear sprocket assembly 28. Conventional transmission responsiveness is ensured by the first operating speed OP5 in the sixth region R6.

The Other Embodiment

As a variation of the above embodiment, the bicycle transmission control device 32 can be configured as follows.

(A) In the above embodiment, explanation is performed as an example that the bicycle transmission control device 32 controls the bicycle electric rear derailleur 26. The bicycle transmission control device 32 can control a bicycle electric front derailleur. In this case, the bicycle 1 includes the bicycle electric front derailleur.

(B) In the above embodiment, explanation is performed as an example that the bicycle transmission control device 32 controls the bicycle electric rear derailleur 26.

Figure 7:
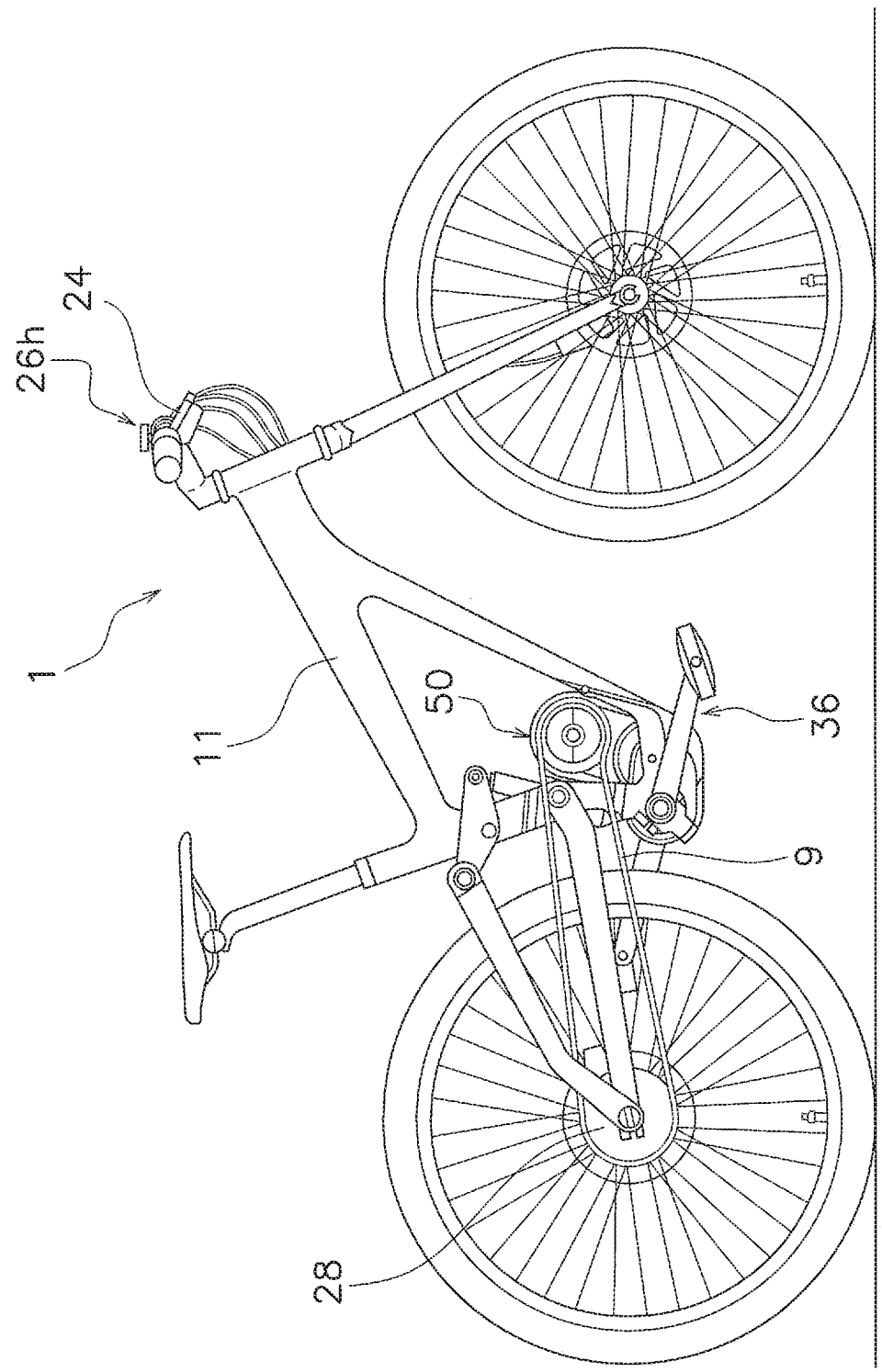
FIG. 7 is a side view of a bicycle according to the other embodiment of the first and second embodiments of the present invention.

As shown in FIG. 7, the bicycle 1 can include a bicycle transmission apparatus 50. The bicycle transmission apparatus 50 is disclosed on the registered US Patent Publication (U.S. Pat. No. 9,623,931 B2).

The bicycle transmission apparatus 50 is mounted to the bicycle frame 11. The bicycle transmission apparatus 50 operates according to rotation of crank arms 36. The bicycle transmission apparatus 50 transmits driving force from the crank arms 36 to the bicycle rear sprocket assembly 28 via the bicycle chain 9.

In this case, the bicycle transmission control device 32 is configured to control the bicycle transmission apparatus 50. The bicycle transmission apparatus 50 changes gear by operating the electric motor based on the signal receiving from the shifting device 24.

The controller 32b configured to control the operating speed of the bicycle transmission apparatus 50 based on the running speed of the bicycle 1 and the gear ratio of the bicycle 1. The operating speed is set as with the above embodiment.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

The foregoing also applies to words having similar meanings such as the terms, "including", "having" and their derivatives. Also, the terms "part," "section," "portion," "member" or "element" when used in the singular can have the dual meaning of a single part or a plurality of parts.

Also as used herein to describe the above embodiment(s), the following directional terms "forward", "rearward", "above", "downward", "vertical", "horizontal", "below" and "transverse" as well as any other similar directional terms refer to those directions of the bicycle transmission control device. Accordingly, these terms, as utilized to describe the present technology should be interpreted relative to the bicycle transmission control device.

The term "configured" as used herein to describe a component, section, or part of a device implies the existence of other unclaimed or unmentioned components, sections, members or parts of the device to carry out a desired function. The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired.

Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time.

Every feature which is unique from the prior art, alone or in combination with other features, also should be considered a separate description of further technologies by the applicant, including the structural and/or functional concepts embodied by such feature(s).

Thus, the foregoing descriptions of the embodiments according to the present technologies are provided for illustration only, and not for the purpose of limiting the technology as defined by the appended claims and their equivalents.

What is claimed is:

1. A bicycle transmission control device comprising:
a controller configured to control an operating speed of a bicycle derailleur based directly on each of a running speed of a bicycle and a gear ratio of the bicycle.

2. The bicycle transmission control device according to claim 1 further comprising:
a memory configured to store a related information with respect to the running speed of the bicycle and the gear ratio of the bicycle.

3. A bicycle transmission control device comprising:
a controller configured to control an operating speed of a bicycle derailleur based on a running speed of a bicycle and a gear ratio of the bicycle, wherein
the operating speed includes a first operating speed and a second operating speed that is different from the first operating speed;
the controller is configured to control the operating speed so that the operating speed is the first operating speed in a state where the running speed is a first running speed and the gear ratio is a first gear ratio; and
the controller is configured to control the operating speed so that the operating speed is the second operating speed in a state where the running speed is a second running speed and the gear ratio is a second gear ratio.

4. The bicycle transmission control device according to claim 3, wherein
the first running speed is equal to the second running speed; and
the first gear ratio is different from the second gear ratio.

5. The bicycle transmission control device according to claim 4, wherein
the first gear ratio is smaller than the second gear ratio; and
the first operating speed is larger than the second operating speed.

6. The bicycle transmission control device according to claim 3, wherein
the first running speed is different from the second running speed; and
the first gear ratio is equal to the second gear ratio.

7. The bicycle transmission control device according to claim 6, wherein
the first running speed is larger than the second running speed; and
the first operating speed is larger than the second operating speed.

8. The bicycle transmission control device according to claim 3, wherein
the first running speed is different from the second running speed; and
the first gear ratio is different from the second gear ratio.

9. The bicycle transmission control device according to claim 8, wherein
the first running speed is larger than the second running speed;
the first gear ratio is larger than the second gear ratio; and
the first operating speed is larger than the second operating speed.

10. The bicycle transmission control device according to claim 8, wherein
the first running speed is smaller than the second running speed;
the first gear ratio is smaller than the second gear ratio; and
the first operating speed is larger than the second operating speed.

11. The bicycle transmission control device according to claim 8, wherein
the first running speed is larger than the second running speed;
the first gear ratio is smaller than the second gear ratio; and
the first operating speed is larger than the second operating speed.

12. The bicycle transmission control device according to claim 8, wherein
the first running speed is larger than the second running speed;
the first gear ratio is smaller than the second gear ratio; and
the first operating speed is smaller than the second operating speed.

13. A bicycle transmission control device comprising:
a controller configured to control an operating speed of a bicycle derailleur based on a running speed of a bicycle and a gear ratio of the bicycle; and
a memory configured to store a related information with respect to the running speed of the bicycle and the gear ratio of the bicycle, wherein
the related information includes a table;
the table includes a first region and a second region that is delimited from the first region by a boundary;
the operating speed is a first operating speed in the first region;
the operating speed is a second operating speed in the second region; and
the controller is configured to change the boundary depending on a cadence of a crank arm of the bicycle.

14. A bicycle transmission control device comprising:
a controller configured to control an operating speed of a bicycle derailleur based on a running speed of a bicycle and a gear ratio of the bicycle, wherein
the operating speed includes a first operating speed and a second operating speed that is different from the first operating speed;
the controller is configured to control the operating speed so that the operating speed is the first operating speed in a state where the running speed is a predetermined running speed and the gear ratio is a predetermined gear ratio while a cadence of a crank arm of the bicycle is a first cadence; and
the controller is configured to control the operating speed so that the operating speed is the second operating speed in a state where the running speed is the predetermined running speed and the gear ratio is the predetermined gear ratio while the cadence of a crank arm of the bicycle is a second cadence that is different from the first cadence.

15. A bicycle transmission control device comprising:
a controller configured to control an operating speed of a bicycle derailleur based on a running speed of a bicycle and a gear ratio of the bicycle, wherein
the operating speed includes a first operating speed, a second operating speed and a third operating speed;
each of the first operating speed and the third operating speed is different from the second operating speed;
the controller is configured to control the operating speed so that the operating speed is the first operating speed in a state where the running speed is a first running speed and the gear ratio is a first gear ratio;
the controller is configured to control the operating speed so that the operating speed is the second operating speed in a state where the running speed is a second running speed and the gear ratio is a second gear ratio; and
the controller is configured to control the operating speed so that the operating speed is the third operating speed in a state where the running speed is a third running speed and the gear ratio is a third gear ratio.

16. The bicycle transmission control device according to claim 15, wherein
the first operating speed is larger than the second operating speed.

17. The bicycle transmission control device according to claim 16, wherein
the third operating speed is larger than the second operating speed.

* * * * *